United States Patent [19]

Kawamura et al.

[11] Patent Number: 4,757,686

[45] Date of Patent: Jul. 19, 1988

[54] CONTROL SYSTEM FOR SUPERCHARGER IN INTERNAL COMBUSTION ENGINE

[75] Inventors: Hideo Kawamura, Samukawa; Katsuyuki Tamai, Yokohama; Shigeki Saito, Katsuta; Toshihiro Yamanaka, Hoya, all of Japan

[73] Assignees: Isuzu Motors Limited; Hitachi, Ltd., both of Tokyo, Japan

[21] Appl. No.: 901,622

[22] Filed: Aug. 29, 1986

[30] Foreign Application Priority Data

Aug. 30, 1985 [JP] Japan .................................. 60-191224

[51] Int. Cl.$^4$ ............................................. F02B 37/00
[52] U.S. Cl. .................................... 60/608; 290/40 C; 290/52
[58] Field of Search ................... 60/597, 598, 607, 608; 290/40 B, 40 C, 52

[56] References Cited

U.S. PATENT DOCUMENTS

| | | | |
|---|---|---|---|
| 2,095,806 | 10/1937 | Frank | 290/40 C |
| 2,359,886 | 10/1944 | Wikkenhauser | 290/40 B |
| 2,558,729 | 7/1951 | Buechler | 290/40 B |
| 3,626,197 | 12/1971 | Zanzarella et al. | 290/40 C |
| 4,529,887 | 7/1985 | Johnson | 290/40 C X |

FOREIGN PATENT DOCUMENTS

| | | |
|---|---|---|
| 0079100 | 5/1983 | European Pat. Off. . |
| 0159146 | 10/1985 | European Pat. Off. . |
| 2206450 | 8/1973 | Fed. Rep. of Germany . |
| 2183337 | 12/1973 | France . |

*Primary Examiner*—Michael Koczo
*Attorney, Agent, or Firm*—Staas & Halsey

[57] ABSTRACT

A motor/generator is mounted on the turbine shaft of a supercharger in an internal combustion engine. Whether the motor/generator should operate as a motor or a generator is determined by a signal from a flow rate sensor that detect the rate of fuel flow and a signal from a rotation sensor that detects rotation of the internal combustion engine. When the motor/generator operates as a generator, the fuel flow rate is controlled in response to an output signal indicative of electric power from the generator. When the motor/generator operates as a motor, electric power supplied thereto is controlled in response to an accumulated value of supplied electric power.

3 Claims, 3 Drawing Sheets

CONTROL SYSTEM FOR SUPERCHARGER IN INTERNAL COMBUSTION ENGINE

CROSS-REFERENCE TO RELATED APPLICATIONS

This application is related to U.S. application Ser. No. 901,150, filed Aug. 28, 1986, and U.S. application Ser. No. 900,375, filed Aug. 26, 1986, which are assigned to the assignee of the subject application.

BACKGROUND OF THE INVENTION

The present invention relates to a control system for a supercharger in an internal combustion engine, and more particularly to a control system for controlling a motor/generator mounted on the turbine shaft of a supercharger when the motor/generator is used as a motor or a generator.

Motor vehicles powered by internal combustion engines are equipped with many electrical devices such as a starter motor, an ignition device, an alarm buzzer device, various illumination devices including headlights, and indicators. These electrical devices are powered by a secondary cell in the form of a battery, which can be charged by a generator mounted on the motor vehicle and driven by the internal combustion engine. New additional electrical devices are being developed nowadays for use on the motor vehicles, and hence the electric power consumption on the motor vehicles is being increased.

To meet the increased electric power demand, the electric power generated by the generator driven by the output of the internal combustion engine is employed to charge the battery. The electric energy thus generated is converted from mechanical rotational energy which is applied from the crankshaft of the internal combustion engine through a V belt to the generator. Therefore, part of the net output from the internal combustion engine is consumed as electric power by electrical devices. With this arrangement, thus, the internal combustion engine is subject to a load.

The external shape or dimensions of the generator are limited by the layout of the internal combustion engine, and the maximum electric power generated by the generator is about 700 W–24 V, for example. Such a limited amount of electric power available may not be able to meet the total amount of electric power consumption which is expected to be increased in the future.

Japanese Patent Application No. 59(1984)-51559 discloses a turbocharger associated with an internal combustion engine. The turbocharger includes a turbine driven by the energy of an exhaust gas emitted from the engine, and a compressor operated by the turbine for charging air into the engine cylinders for efficiently burning fuel therein. When the internal combustion engine operates at a low speed, however, the pressure of charged air is low since the exhaust gas energy is small, resulting in low charging efficiency, and the output power and torque of the engine are not sufficient.

SUMMARY OF THE INVENTION

It is an object of the present invention to provide a control system for a supercharger in an internal combustion engine, capable of charging a battery without consumption of the net output of the internal combustion engine.

Another object of the present invention is to provide a control system for a supercharger in an internal combustion engine, capable of improving a torque generated by the engine when the engine operates at low speeds.

Still another object of the present invention is to provide a control system for a supercharger in an internal combustion engine, capable of detecting the output electric power generated by a motor/generator mounted on the turbine shaft of the supercharger when the motor/generator is operated as a generator, and of controlling the fuel flow rate of the engine based on the detected signal.

According to the present invention, there is provided a control system for a supercharger in an internal combustion engine with a motor/generator mounted on a turbine shaft of the supercharger, the control system comprising electric power detecting means for detecting an output from the motor/generator to generate an electric power output signal, fuel supply means for supplying fuel to the internal combustion engine, fuel flow rate control means associated with the fuel supply means for controlling a rate of fuel flow from the fuel supply means, and control means for controlling the rate of fuel flow from the fuel flow rate control means in response to the electric power output signal from the electric power detecting means.

According to the present invention, there is also provided a control system for a supercharger in an internal combustion engine with a motor/generator mounted on a turbine shaft of the supercharger, the control system comprising electric power integrating means for detecting input electric power applied to the motor/generator to calculate an integrated value of the input electric power to generate a signal indicative of the integrated value, a battery for supplying electric power to the motor/generator, and means for controlling the electric power supplied from the battery in response to the signal from the electric power integrating means.

DESCRIPTION OF THE PREFERRED EMBODIMENT

Figure 1:
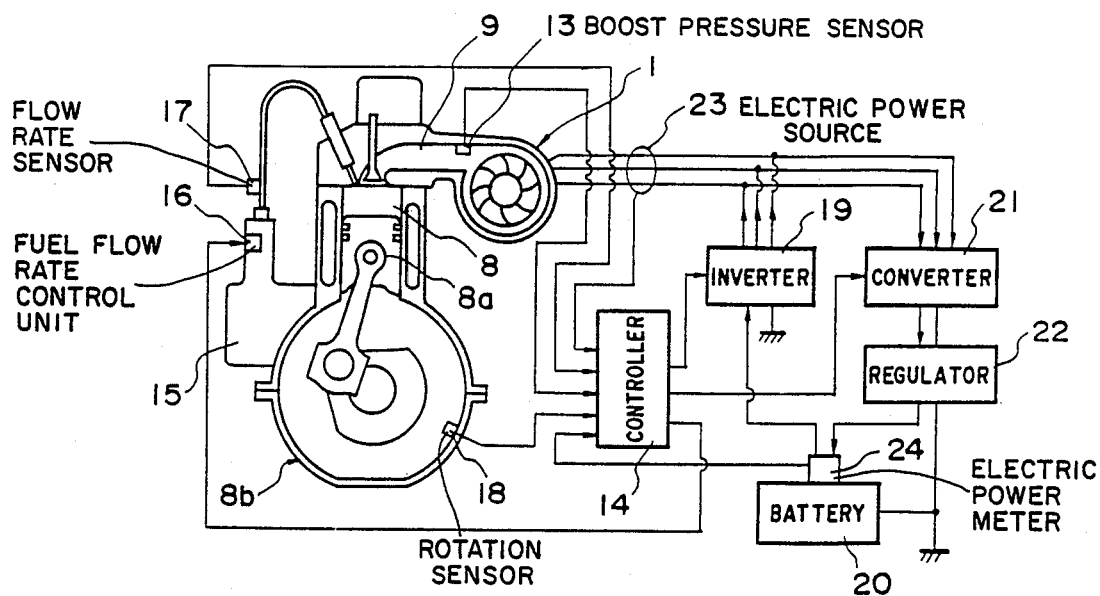
FIG. 1 is a block diagram of a control system according to an embodiment of the present invention.
Figure 2:
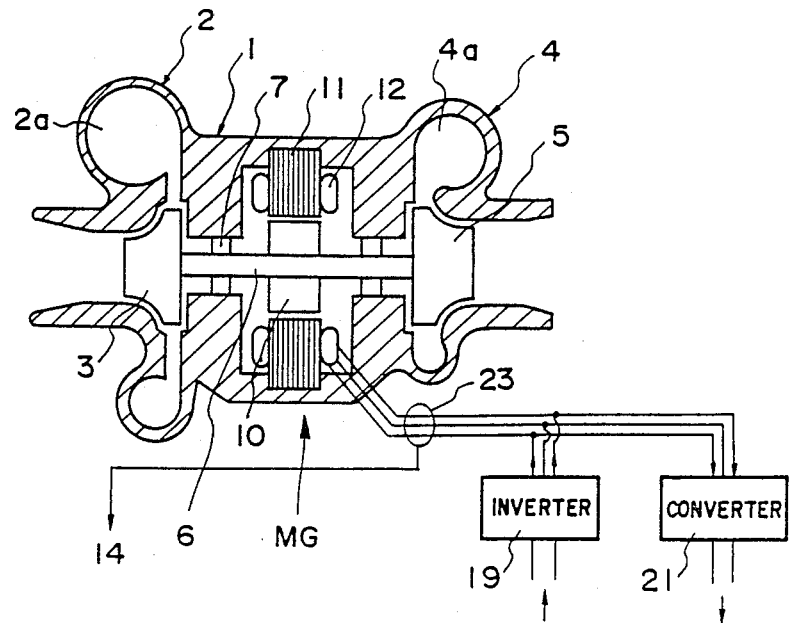
FIG. 2 is a cross-sectional view, partly in block form, of a supercharger and related components.

Referring to FIGS. 1 and 2, a supercharger 1 includes a compressor 2, a compressor impeller 3, a turbine 4, and a turbine impeller 5. The turbine impeller 5 and the compressor impeller 3 are directly coupled to each other by a shaft 6 which is rotatably supported by bearings 7 in the supercharger 1. The turbine 4 communicates through a scroll 4a with an exhaust manifold of an internal combustion engine 8. The turbine impeller 5 is rotated by the energy of an exhaust gas emitted from the engine to cause the shaft 6 to rotate the compressor impeller 3. Air introduced from an air cleaner (not shown) by the compressor impeller 3 is pressure-converted by a diffuser 2a, from which the air is supplied under pressure into a cylinder 8a of the internal combustion engine 8.

An annular magnet rotor 10 is mounted substantially centrally on the shaft 6, the magnet rotor 10 containing a rare earth element for producing a strong magnetic force. The outer periphery of the magnet rotor 10 is covered with carbon fiber secured wound thereon so that the magnet rotor 10 is durable enough against damage which would otherwise be caused by centrifugal forces or vibration upon ultrahigh-speed rotation of the magnet rotor 10.

A stator core 11 is disposed in confronting relation to the magnet rotor 10 and supports a stator coil 12 which induces an AC voltage in response to rotation of the magnet rotor 10. When the stator coil 12 is supplied with an AC current, the magnet rotor 10 is rotated. Therefore, the stator core 11, the stator coil 12, and the magnet rotor 10 jointly form an AC machine serving as a motor/generator MG.

A boost pressure sensor 13 is mounted in an intake pipe 9 for detecting the boost pressure of air delivered by the compressor impeller 3 and applying a signal indicative of the detected boost pressure to a controller 14. A fuel injection pump 15 is mounted on the internal combustion engine 8 for injecting fuel controlled by a fuel flow rate control unit 16 into the engine cylinder 8a. The rate of fuel flow thus injected is detected by a flow rate sensor 17 which transmits a signal representative of the detected flow rate to the controller 14. A rotation sensor 18 is mounted in a crankcase of the internal combustion engine 8 for detecting the engine speed or R.P.M. of the crankshaft and applying a speed signal to the controller 14.

A PWM-type pulse width modulation-type inverter 19 converts a direct current from a battery 20 to an alternating current to supply electric power to the stator coil 12. When the PWM-type inverter 19 thus operates, the motor/generator MG operates as a motor to rotate the shaft 6 which is being rotated by the exhaust energy for urging the shaft 6 to assist the compressor impeller 3 in charging air. The magnitude and turn-on and turn-off of the electric power supplied to the stator coil 12 are controlled by the controller 14.

A PWM-type converter 21 is supplied with electric power generated when the motor/generator MG operates as a generator, controls the voltage of the generated electric power and applies the voltage to a smoothing regulator 22. The regulator 22 regulates the electric power from the converter 21 so as to match the battery 20, and charges the battery 20.

An electric power sensor 23 serves as electric power detecting means for detecting electric power fed from the stator coil 12 to the converter 21 at the time the motor/generator MG operates as a generator. A signal indicative of the detected electric power is transmitted from the electric power sensor 23 to the controller 14.

An electric power meter 24 is connected to the terminals of the battery 20 and serves as electric power integrating means for calculating electric power supplied from the battery 20 when the motor/generator MG operates as a motor and an integrated value of such electric power. The electric power meter 24 can detect the voltage across the terminals of the battery 20, charge and discharge currents, and the integrated electric power, and applies signals indicative of such voltage, currents, and integrated electric power to the controller 14.

The controller 14 is supplied with inputs including signals from the flow rate sensor 17, the rotation sensor 18, the boost pressure sensor 13, the electric power sensor 23, and the electric power meter 24, and issues command signals to control the fuel flow rate control unit 16, the inverter 19, and the converter 21. If the signals from the flow rate sensor 17 and the rotation sensor 18 have values in a predetermined first range, then the controller 14 applies a command signal to the converter 21 to enable the same to control the electric power from the stator coil 12 at a prescribed voltage and to charge the battery 20 through the regulator 22. If the signals from the flow rate sensor 17 and the rotation sensor 18 have values in a predetermined second range, then the controller 14 checks whether the signal from the boost pressure sensor 13 has a prescribed value or not, and at the same time applies a command signal to the inverter 19 to enable the same to convert a direct current from the battery 20 to an alternating current for operating the motor/generator MG as a motor. The controller 14 is also supplied with a signal indicative of an integrated amount of discharged electric power from the electric power meter 24 and controls the inverter 19 so that the battery 20 will not be excessively discharged.

Figure 3:
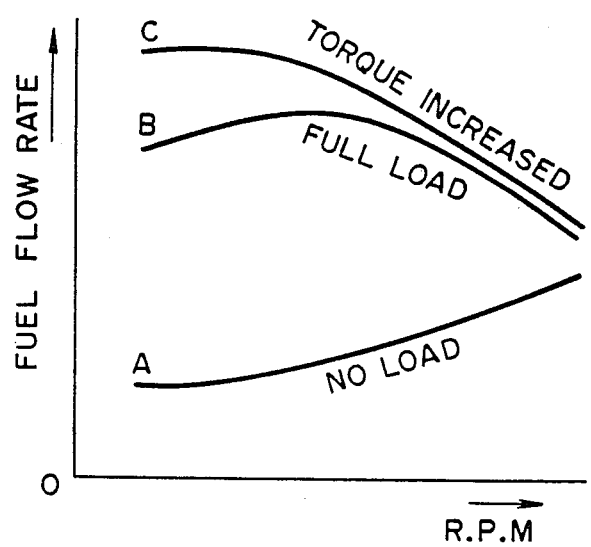
FIG. 3 is a graph showing load conditions indicated by the rate of fuel flow of an internal combustion engine and the engine R.P.M.

FIG. 3 illustrates load conditions indicated by the rate of fuel flow of an internal combustion engine and the engine R.P.M. Indicated at A is a no-load curve, B a full-load curve, and C an increased-torque curve. A partial load range between the no-load curve A and the full-load curve B indicates the aforesaid first range, for example, and a load range between the full-load curve B and the increased-torque curve C indicates the aforesaid second range, for example.

Figure 4:
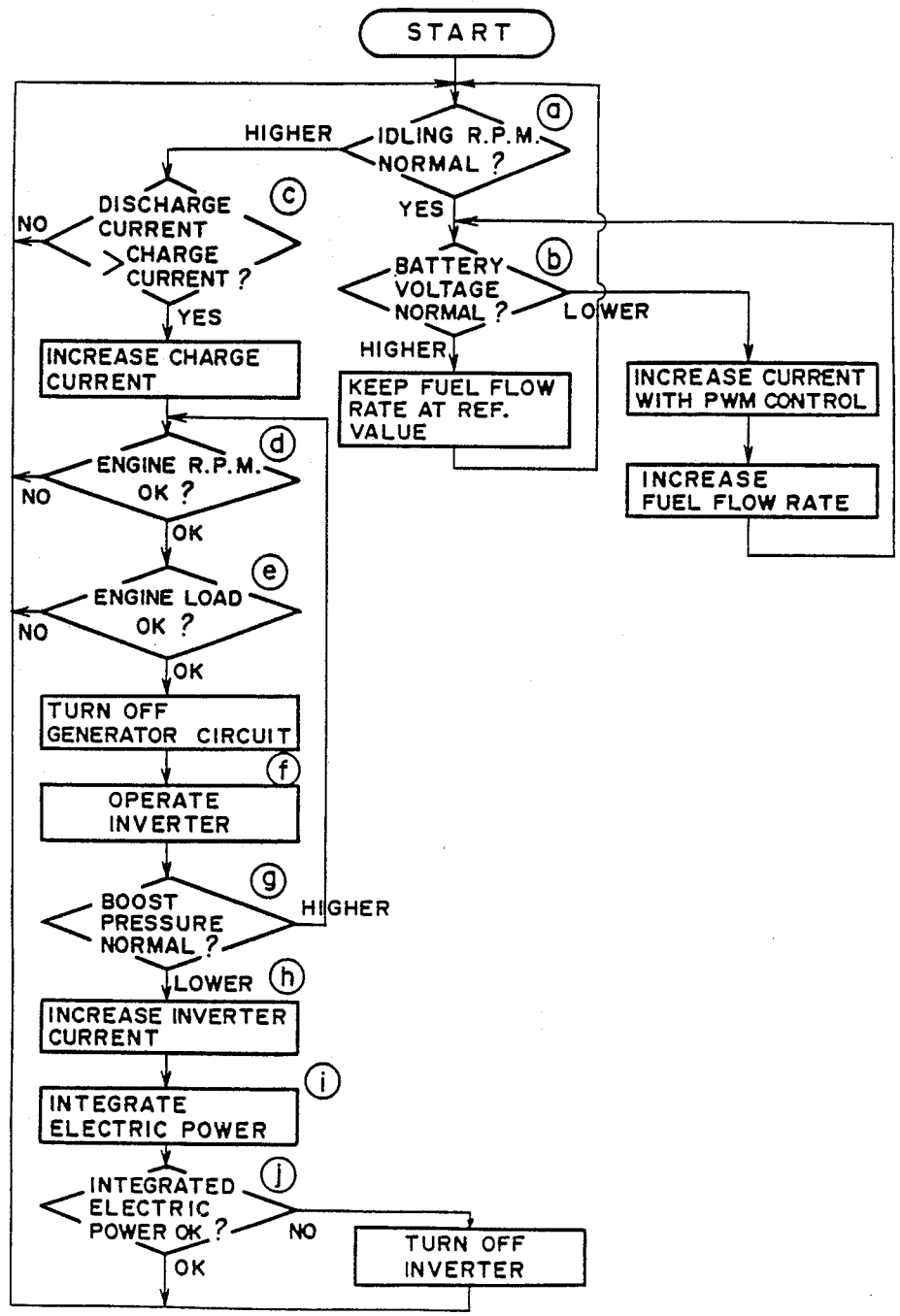
FIG. 4 is a flowchart of an operation sequence of the control system of the present invention.

Operation of the control system according t the present invention will be described with reference to the flowchart of FIG. 4.

The R.P.M of the crankshaft is checked from the signal of the rotation sensor 18. If the crankshaft R.P.M. is a predetermined idling R.P.M. in a step a, then the voltage of the battery 20 is checked in a step b. If the signal representative of the voltage from the electric power meter 24 is normal or higher than a prescribed value, then the battery 20 is not required to be charged, and the fuel flow rate control unit 16 is controlled to keep the fuel flow rate at a reference value. Thereafter, control returns to the step a.

If the battery voltage is lower than the normal voltage in the step b, then the converter 21 is controlled to control the current from the stator coil 12 to charge the battery 20 through the regulator 22. If the detected electric power indicated by the signal from the electric power sensor 23 represents a small electric current, the fuel flow rate control unit 16 is controlled to increase the fuel flow rate by a small amount to increase the exhaust gas energy for thereby operating the generator at an increased rate. Thereafter, control goes back to the step b for checking the battery voltage again. If the battery voltage is lower than the prescribed voltage, then the foregoing operation increases the current which charges the battery. The fuel flow rate is increased in small increments so that it is controlled within a certain deviation of the idling R.P.M. of the internal combustion engine.

If the crankshaft speed is higher than the predetermined R.P.M. in the step a, then the signals indicative of the charge and discharge currents from the electric power meter 24 are checked in a step C. If the discharge current is larger than the charge current, then the charge current from the motor/generator MG is increased by the PWM control or increasing the fuel flow rate, thus increasing the rotative force of the magnet rotor 10. Then, the engine R.P.M. is checked by the signal from the rotation sensor 18 in a step d, and the engine load is checked by the signal from the flow rate sensor 17 in a step e. If both of the signals from the sensors 17, 18 are in the first range, then the motor/generator is operated as a motor in a step f. More specifically, the converter 21 is controlled to cut off the current from the stator coil 12, and the inverter 19 is controlled to convert a direct current from the battery 20 to an alternating current, which is supplied to the stator coil 12 to assist the compressor impeller 3 in charging air. Then, a step g checks the signal from the boost pressure sensor 13. If a prescribed boost pressure is not obtained, then the inverter 19 is controlled to increase the current supplied to the stator coil 12 in a step h for thereby increasing the motor output to increase the boost pressure which is produced by the operation of the compressor 2. Since, however, the amount of electric power discharged from the battery 20 is large under this condition, a step i integrates signals indicative of electric power from the electric power meter 24, and then a step j checks the integrated amount of electric power. If the integrated amount of electric power is below a prescribed level, then control returns to the step a. If the integrated amount of electric power is in excess of the prescribed level, the battery 20 would be excessively discharged and damaged, and hence the inverter 19 is controlled so that its operation is stopped.

After the inverter 19 has started operation to operate the motor/generator as a motor in the step f, if the boost pressure is higher than a prescribed level, then control goes back to the step d. The step i of integrating electric power discharged from the battery 20 and the step j of checking the integrated amount of electric power are carried out at all times when elecric power is discharged from the battery 20 to other electric devices, so that the battery 20 is prevented from being excessively discharged.

Although a certain preferred embodiment has been shown and described, it should be understood that many changes and modifications may be made therein without departing from the scope of the appended claims.

What we claim is:

1. A control system for a supercharger in an internal combustion engine with a motor/generator, said control system comprising:
   electric power detecting means for detecting an output from the motor/generator and for generating an electric power output signal;
   fuel supply means for supplying fuel to the internal combustion engine;
   fuel flow rate control means, coupled to said fuel supply means, for controlling a rate of fuel flow from said fuel supply means;
   control means for controlling said fuel flow rate control means to control the rate of fuel flow from said fuel supply means in response to the electric power output signal from said electric power detecting means;
   a flow rate sensor, coupled to said fuel supply means, for detecting the rate of fuel flow and for generating a signal indicative of the detected rate of fuel flow;
   a rotation sensor, coupled to the internal combustion engine, for detecting rotation of the internal combustion engine and for generating a signal indicative of the detected rotation; and
   means for determining whether the motor/generator should operate as a motor or a generator based on the signals generated by said flow rate sensor and said rotation sensor.

2. A supercharger for an internal combustion engine, comprising:
   a rotary shaft;
   a motor/generator mounted on said rotary shaft;
   electric power detecting means for detecting an output from said motor/generator and for generating an electric power output signal;
   means for supplying fuel to the internal combustion engine;
   fuel flow rate control means, coupled to said fuel supply means, for controlling the rate of fuel flow from said fuel supply means;
   control means for controlling said fuel flow rate control means to control the rate of fuel flow from said fuel supply means in response to the electric power output signal from said electric power detecting means;
   a flow rate sensor, coupled to said fuel supply means, for detecting the rate of fuel flow and for generating a flow rate signal indicative of the detected rate of fuel flow;
   a rotation sensor, coupled to the internal combustion engine, for detecting rotation of the internal combustion engine and for generating a rotation detection signal; and
   means for determining whether said motor/generator should operate as a motor or a generator based on the flow rate signal and the rotation detection signal.

3. A control system for an internal combustion engine having a supercharger, comprising:
   an internal combustion engine which emits exhaust gases;
   a supercharger operable by the exhaust gases emitted from said internal combustion engine and having a rotary shaft;
   a motor/generator disposed on the rotary shaft of said supercharger, said motor/generator providing an output;
   electric power detecting means for detecting the output from said motor/generator and for generating an electric power output signal;
   fuel supply means for supplying fuel to said internal combustion engine;
   a flow rate sensor, coupled to said fuel supply means, for detecting the rate of fuel flow and for generating a flow rate signal indicative of the detected rate of fuel flow;
   a rotation sensor, coupled to said internal combustion engine, for detecting rotation of said internal combustion engine and for generating a rotation detection signal;
   means for determining whether said motor/generator should operate as a motor or a generator based on the flow rate signal and the rotation detection signal; and
   means for controlling the rate of fuel flow to the internal combustion engine based on the electric power output signal.

* * * * *